United States Patent [19]

Lefler et al.

[11] 4,196,483

[45] Apr. 8, 1980

[54] PORTABLE MATTRESS SUPPORT

[76] Inventors: Robert J. Lefler, 1536 N. Shore Dr., Asheboro, N.C. 27203; George H. Kahl, Jr., 1640 Ardsley St., Winston-Salem, N.C. 27103; Thomas E. Waldrop, 8007 Kidd St., Alexandria, Va. 22309

[21] Appl. No.: 926,569

[22] Filed: Jul. 19, 1978

[51] Int. Cl.² .............................................. A47C 19/00
[52] U.S. Cl. ............................................ 5/118; 5/63; 5/103; 296/24 R
[58] Field of Search ...................... 5/62, 63, 103, 118; 254/93; 267/156, 157; 296/24; 297/307–309; 248/373, 389, 399, 400

[56] References Cited

U.S. PATENT DOCUMENTS

| | | | |
|---|---|---|---|
| 3,174,722 | 3/1965 | Alm | 254/93 |
| 3,371,359 | 3/1968 | Dome | 5/118 |
| 3,760,436 | 9/1973 | Zach et al. | 5/118 |
| 3,902,205 | 9/1975 | Bell | 5/118 |

*Primary Examiner*—Casmir A. Nunberg

[57] ABSTRACT

A portable mattress support adapted to be readily installed and removed from a confined space and especially in a tractor cab sleeping quarter area, whereby the support permits the absorption of various forces without imparting the same to the user.

7 Claims, 5 Drawing Figures

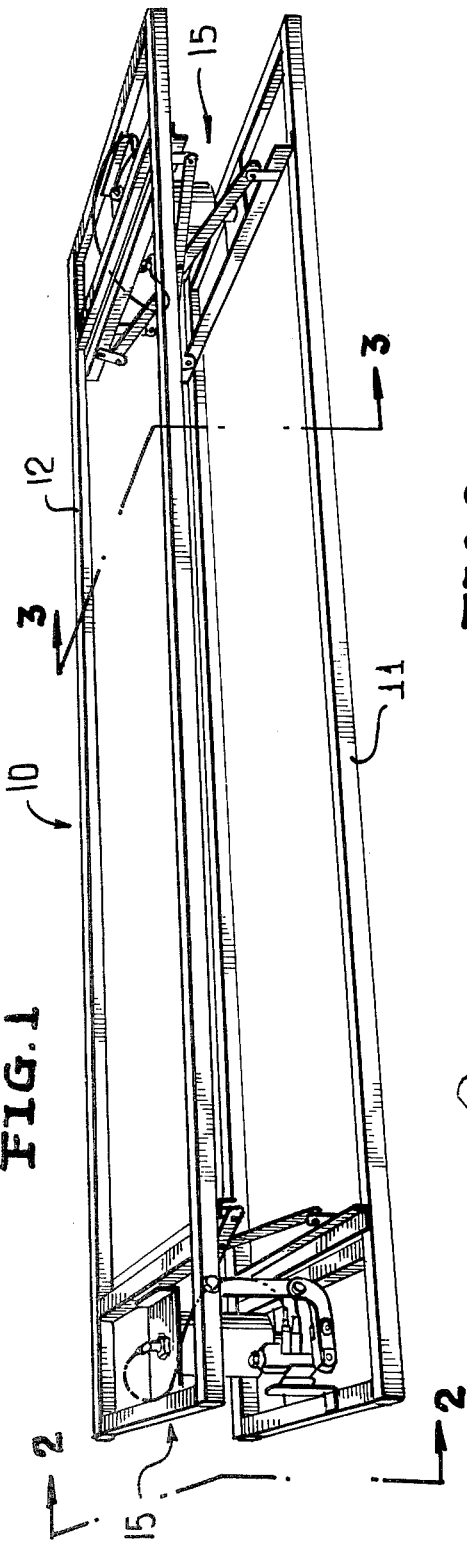
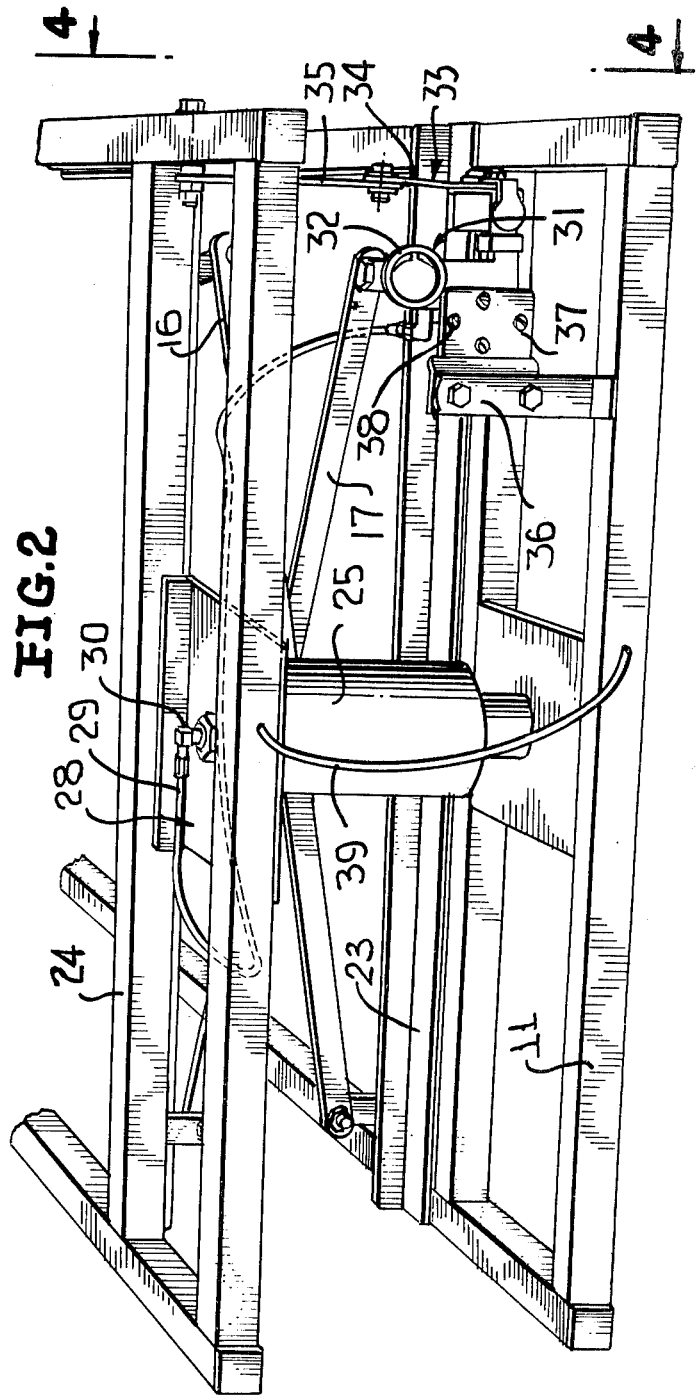

PORTABLE MATTRESS SUPPORT

BACKGROUND OF INVENTION

The prior art is aware of various portable mattress supports adapted to be erected and folded within a confined area such as a vehicle, tent and the like. These supports when positioned on a non-moving surface afford as much comfort as is possible notwithstanding the general simplicity of the same. However, when the surface is a moving one, problems of comfort are serious. As is appreciated, truck drivers making long hauls desire rest breaks while the vehicle is moving. The present day supports do not afford the driver the optimum amount of rest as the same are not designed to compensate for the weight of the driver and roughness of the surface being traversed.

It is the general purpose of the present invention to provide a mattress support which is a great improvement over the existing types.

SUMMARY OF INVENTION

A mattress support is provided in which there are relatively few component parts which can be economically fabricated, assembled, installed and removed as desired. Simply, the support is comprised of a base frame and an auxiliary frame positioned thereover and secured for movement relative thereto by the use of an air cylinder, valve control means controlling the introduction of air therein and thereout, a control means controlling said valve and a lever mechanism which absorbs swaying forces, all of which are disposed between said frames.

This relationship permits the cylinder to move the auxiliary frame to a pre-set level notwithstanding the weight of the user.

BRIEF DESCRIPTION OF THE DRAWINGS

FIG. 1 is an elevational view showing the mattress support in its entirety.

FIG. 2 is an end view taken on line 2—2 of FIG. 1.

BRIEF DESCRIPTION OF THE PREFERRED EMBODIMENT

With reference to FIG. 1, the portable mattress support is seen at 10 and is comprised of a lower rectangular frame 11, having an upper rectangular frame 12 disposed thereabove in alignment with the same. The upper frame 12 is capable of being moved with respect to the lower frame 11 via the raising means positioned at either end of the frame and designated generally as 15. From this arrangement the upper frame is capable of being moved toward and away from the lower frame 11 to a selected position as determined by the user by introducing fluid into a cylinder in a manner as will be described hereinafter.

Figure 3:
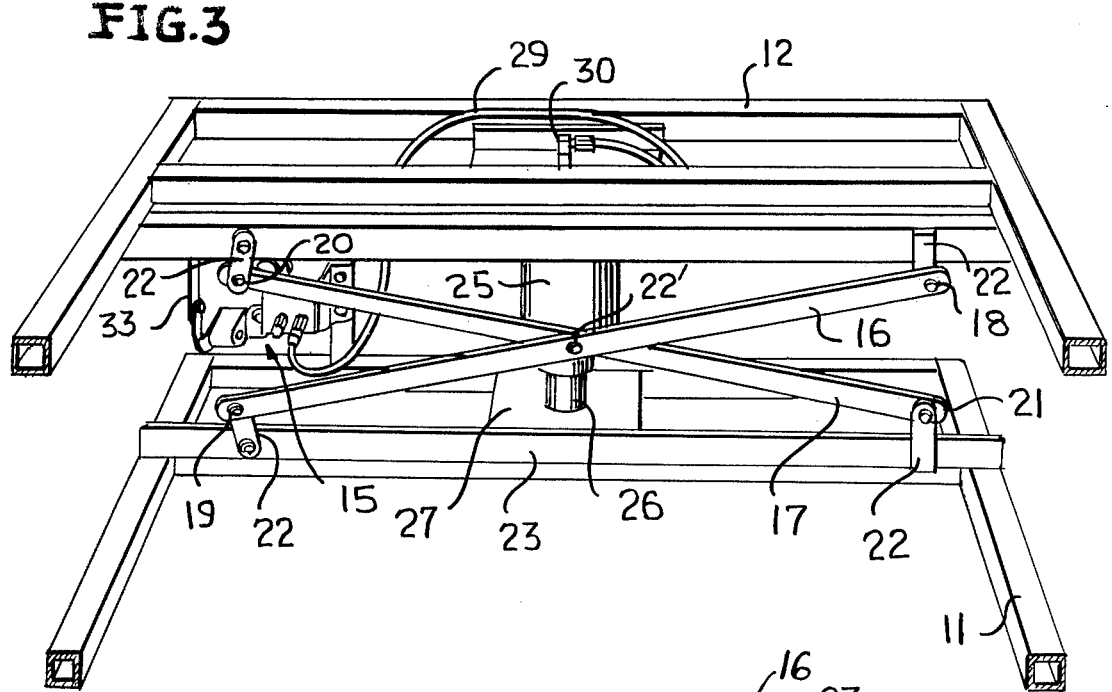
FIG. 3 is an end view taken on the lines 3—3 of FIG. 1.
Figure 4:
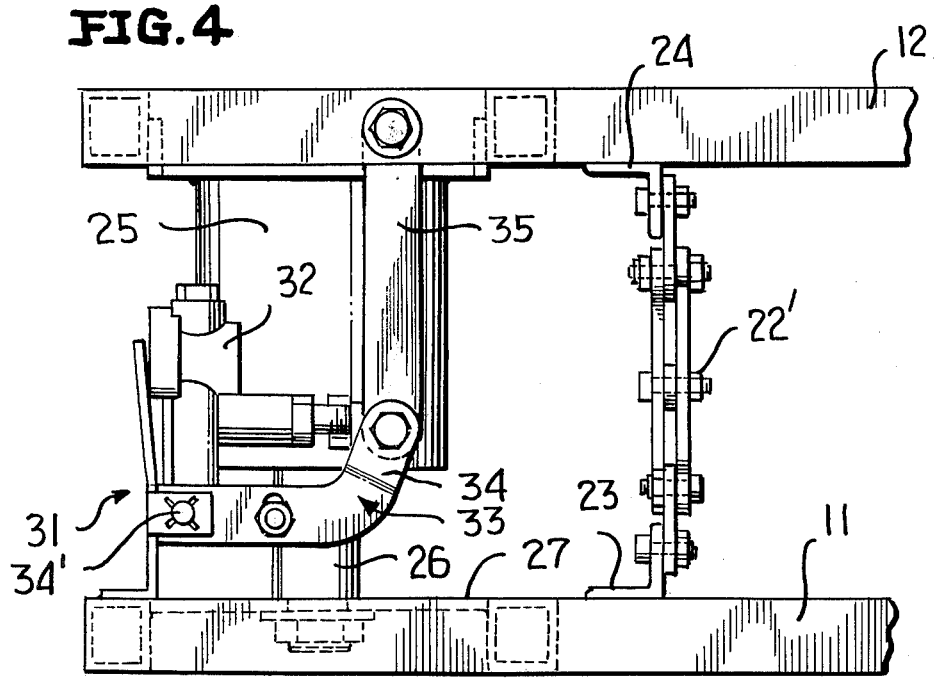
FIG. 4 is a side view taken on the line 4—4 of FIG. 2.

With reference to FIGS. 2 through 4 inclusive, the details of the raising means will be more clearly seen. As seen in FIG. 3 the raising means 15 is comprised of a pair of intersecting levers 16, 17, pivoted at their respective ends 18, 19, 20, 21, to the upper and lower frames 11 and 12. The levers 16 and 17 are secured at their intersection to one another by a securing means such as a bolt and nut, rivet or the like 22'. Additionally, the ends of the links 16 and 17 are pivoted to short arm members 22 which in turn are secured to brace elements 23, 24 secured to the lower and upper frames 11, 12, respectively. These brace members 23, 24 as seen in FIGS. 2 and 4 are L-shaped in configuration and are secured to the frames 11, 12 by welding or the like.

A fluid cylinder 25 is disposed rearwardly of the links 16, 17 and is of conventional configuration and function and is secured between the frames 11 and 12 by mounting the piston 26 to a plate 27 centrally disposed with respect to the frames 11, 12 and at the junction of the securing means 22' of the links 16, 17. The plate 27 is secured to the bottom frame 11 between the end bar and a transverse end bar spaced therefrom. The cylinder 25 has fluid introducing means 28 comprising a hose 29, and a connection 30 which selectively introduces and removes fluid from the top of the cylinder 25 via the control means 31 positioned adjacent the cylinder. The control means 31 includes an automatic height control valve 32 in communication with the hose 29 which includes a delay feature, not shown, which delays the addition or release of fluid into or from the cylinder 25 until a control arm 33 of the valve 32 remains in a raised or lowered position from 14 to 18 seconds. As seen in FIGS. 3 and 4, the control arm 33 is seen to be comprised of two interconnected links 34, 35 secured between the upper and lower frames 11 and 12.

The control means 31 is secured to the bottom frame 11 by a bracket 36 having a plate 37 extending therefrom which maintains the valve 32 in place by the use of screws 38. The links 34, 35 add rigidity to the other end of the valve and maintain the same in a level secured position.

Figure 3A:
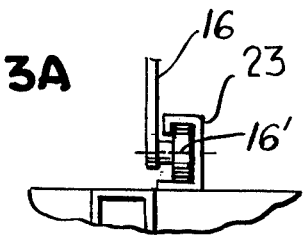
FIG. 3A is a detailed showing of a roller mechanism of a modification.

Referring back to FIG. 2, it will be noted that a restraining strap 39 is positioned between the upper and lower frames in a generally fixed relationship for limiting the movement of the upper frame away from the lower frame as well as maintaining the cross arms in their original crossed position. Springs (not shown) are provided in conjuction with links 16, 17 to further maintain the top frame 12 centered with respect to the lower frame. Additionally and complementing the aforementioned restraining devices disposed between the upper and lower frames 11, 12 the lower ends of the links 16, 17 adjacent the brace 23 are provided with rollers 16', see FIG. 3A, which are constrained in the brace to permit the links 16, 17 to move therein to absorb lateral forces. While the leveling means at one one of the frames has been described it is to be understood that the leveling means at the opposite end thereof functions in the same manner.

In use, with the support positioned in a trailer tractor sleeping compartment, the user, lies on the mattress disposed on the support and initially his weight will cause the valve control 32 to permit the introduction of air into the air spring 25 in response to downward movement of levers 33, 35 (due to his weight) until a sufficient amount of air has been introduced to raise the upper frame 12 to a pre-set level whereat the supply of air will be terminated.

This pre-set level will always be automatically maintained not withstanding the weight of the user whereby the frames 11, 12 are capable of moving towards and away from each other in order to insure an equal amount of cushioning during the resting period regardless of the occupant's weight.

Additionally, the lower movement of the lever 33 enhance the overall cushioning effect of the support by reducing fore and aft movement of frame 12.

What is claimed is:

1. A mattress support comprising a generally rectangular elongated base frame and an auxiliary frame disposed one above the other in substantial alignment, means positioned between said auxiliary frame and said base frame at the ends thereof maintaining the auxiliary frame thereabove, said means including a fluid cylinder means, a supply of fluid therefor, valve control means connected to said supply and said cylinder means for automatically controlling the movement of fluid therein and thereout, intersecting lever means pivotally disposed between said frames adjacent to said cylinder means with the lower portion of each of the lever means being provided with a roller movable in a track member positioned on said base frame, said lever means being transversely positioned with respect to the longitudinal axis of the frames, and weight responsive means positioned between said auxiliary frame and said control means regulating said valve means upon the placement of weight on said auxiliary frame.

2. The mattress support of claim 1 wherein a restraining means is positioned between the upper auxiliary frame and the base frame support for limiting the upward movement of said auxiliary frame.

3. The mattress support of claim 2 wherein said restraining means is a belt attached to the said respective frames.

4. The mattress support of claim 1 wherein said weight responsive means is comprised of pivoted links positioned between the auxiliary frame and the valve control means whereby collapsing of the same will cause the valve to regulate the flow of fluid into the cylinder means.

5. The mattress support of claim 1 wherein said fluid cylinder is supported on a plate secured to the base frame at the end and centrally thereof.

6. The mattress support of claim 1 wherein the valve control means permits a predetermined amount of fluid to be introduced into said cylinder whereby the same will raise the auxiliary frame to a pre-set level notwithstanding the weight positioned on said auxiliary frame whereby an equal amount of cushioning will always been obtained.

7. The mattress support of claim 6 wherein the base frame and the auxiliary frame are rectangular in configuration and disposed in general alignment with one another.

* * * * *